J. C. PHELPS.
TERMINAL FITTING FOR ELECTRIC CONDUITS.
APPLICATION FILED OCT. 2, 1914.

1,224,320.

Patented May 1, 1917.

WITNESSES:
H. E. Hartwell.
Edith M. Potter

INVENTOR.
James C. Phelps.
BY Chapin & G.
ATTORNEY.

UNITED STATES PATENT OFFICE.

JAMES C. PHELPS, OF SPRINGFIELD, MASSACHUSETTS.

TERMINAL FITTING FOR ELECTRIC CONDUITS.

1,224,320.

Specification of Letters Patent.

Patented May 1, 1917.

Application filed October 2, 1914. Serial No. 864,688.

*To all whom it may concern:*

Be it known that I, JAMES C. PHELPS, a citizen of the United States of America, residing in the city of Springfield, county of Hampden, and State of Massachusetts, have invented certain new and useful Improvements in Terminal Fittings for Electric Conduits, of which the following is a specification.

My invention relates to improvements in terminal fittings for electric conduits. The invention is especially designed for closing the ends of iron conduits which are used for electric wires.

An object of the invention is to provide a simple and inexpensive fitting which will effectively close the end of an electric conduit, and, at the same time, will spread or separate the electric wires from each other as they extend from the end of the conduit.

A further object of the invention is to provide a fitting that can be quickly and firmly attached to the threaded end of the conduit without twisting or disturbing the wires.

The fitting, in general, comprises an insulating member or cap having openings therethrough that are arranged at an angle or divergent to the axis of the conduit for receiving the wires. The fitting is attached to the conduit by means of a threaded connector, or sleeve, one end of which is formed with threads and the other with a flange portion to engage a nut on the threaded end of the conduit.

Figure 1:
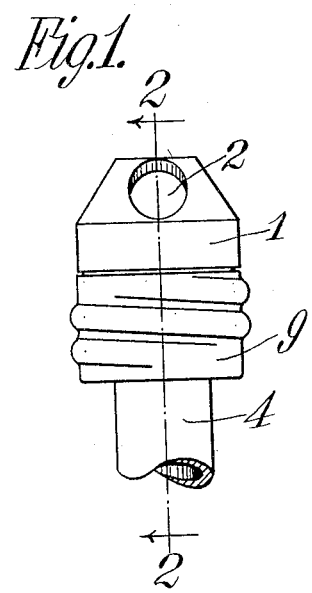
Figure 2:
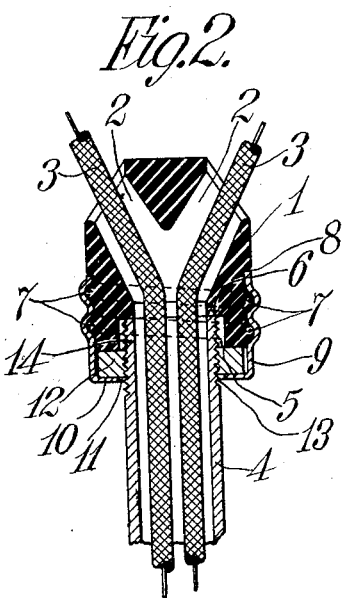
Figure 3:
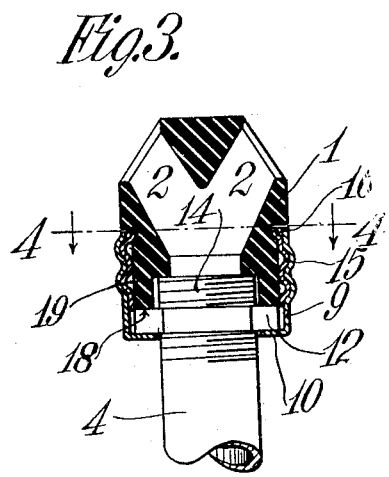
Figure 4:
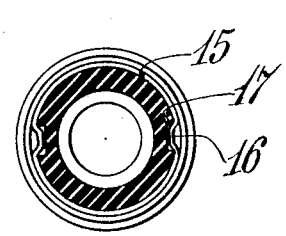

The invention is illustrated in the accompanying drawings in which:

Figure 1 is an exterior view of the fitting,

Fig. 2 is a vertical sectional view taken on a plane passing through the vertical axis of the conduit, showing the threaded sleeve connecting device engaging the threads on the lower end of the fitting, Fig. 3 is a slight modification in which a threaded sleeve is fixedly attached to the fitting and engaging this threaded sleeve is a second threaded connector by means of which the fitting is attached to the conduit; and Fig. 4 is a transverse sectional view on line 4—4 of Fig. 3, showing the manner of permanently attaching the threaded sleeve to the fitting of insulating material.

Referring to the drawings in detail: 1 designates the terminal fitting member which, as shown, is formed with inclined arranged openings 2 to receive the electric wires 3. 4 designates the usual iron conduit or pipe in which the wires 3 are placed. The lower end of the fitting 1 is formed with a recessed portion 5 to receive the threaded end of the conduit. This recessed portion affords a shoulder 6 with which the end of the conduit engages when in place for bushing the conduit. The outer or lower surface of the fitting is formed or molded with integral threads 7, the root portion of the threads being below the outer surface of the fitting, as indicated at 8, the object of which is to provide a substantially flush surface between the unthreaded portion of the fitting and the attaching threaded sleeve 9. This attaching sleeve, as shown, is formed with an inwardly extending annular flange 10 having an opening 11 therethrough to receive the threaded end of the conduit 4. 12 is a nut that engages the threads 13 of the conduit 4.

It will be seen from this construction that in order to attach the fitting 1 to the end of the conduit 4 it is only necessary for the workman to place the threaded sleeve 9 over the end of the conduit, next rotate the nut 12 on the threads of the conduit until the portion 14 of the conduit will nearly engage the shoulder 6 of the fitting. The operator now places the wires 3 through the openings 2 of the fitting; and finally threads the sleeve 9 onto the threads 7 of the fitting of the cap 1, to rigidly secure the same to the end of the conduit. It will be noticed that the flange 10 of the threaded sleeve engages the nut 12 and the nut is in turn drawn against the lower edge of the terminal cap or fitting 1. The cap or fitting is therefore attached to the conduit without disturbing or twisting the wires therein.

Figs. 3 and 4 show a slight modification in which instead of forming threads directly on the cap or fitting 1, a threaded sleeve 15 is fixedly secured to the cap by means of indented portions 16 which engage recesses 17 in the cap, as clearly shown. This threaded sleeve extends to the lower edge 18 of the cap, the cap having a reduced cylindrical portion 19 to receive the threaded sleeve 15. The manner of attaching the fitting or cap 1, shown in Figs. 3 and 4, is identical with that previously described in connection with Figs. 1 and 2 and need not therefore be repeated.

It will be seen from this description that I have provided means for rapidly and securely attaching a terminal fitting or cap to the threaded end of an electric conduit without disturbing the wires therein.

It is to be understood that the threads 7 on the insulating cap 1 are preferably formed or molded when the cap is cast. They may, if desired, be cut by any suitable means. In the modified form in Figs. 3 and 4 the threaded sleeve 15 is used where it is found difficult to cut or mold them directly on or integral with the insulating material of which the cap 1 is composed.

It is to be understood that the nut 12 does not necessarily have to actually engage the lower end of the porcelain cap for the reason that the flange of the threaded sleeve will engage the nut 12 and the threads on the cap and thus draw the cap to the conduit. It should also be mentioned that the metal threaded sleeve 9 will engage the wall when the conduit is secured thereto and prevent the breaking of the porcelain cap as readily understood.

What I claim is:

1. In a device of the character described, the combination with the threaded end of a conduit, of a terminal cap fitting, a threaded sleeve secured to said cap and below the external surface thereof and terminating at the lower end of the cap, a nut on the threaded end of the conduit, and a second threaded sleeve engaging the nut and the threaded sleeve on the cap to secure the cap to the conduit.

2. The combination with the threaded end of an electric conduit, a cap, a threaded sleeve permanently secured to the cap, the cap having an annular recessed portion to receive the end of the conduit, a nut on the threaded end of the conduit engaging the lower end of the cap, and a second threaded sleeve having an apertured flange portion through which the end of the conduit passes, said flange engaging the lower side of the nut, whereby when the second threaded sleeve is screwed onto the threaded sleeve on the cap said cap and conduit will be secured together.

3. An insulating cap for closing the open end of an electrical conduit having threads on its outer end, the cap having a recessed end for receiving the end of the conduit, a threaded sleeve, said sleeve having an apertured inturned flange to receive the threaded end of the conduit and being spaced away from the lower end of the cap, a nut on the threaded portion of the conduit and engaging the lower end of the cap, said flange engaging the lower side of the nut, whereby when the sleeve is rotated the recessed portion of the cap will be drawn into contact with the end of the conduit, the cap being provided with a plurality of inclined openings to receive the electric wires, as described.

4. The combination with the threaded end of an electric conduit, a cap composed of insulating material for closing the outlet end of said conduit, and provided with threads on its outer surface and extending to its lower end portion, the roots of said threads being below the external surface of the cap, the cap having an annular recessed portion for receiving the end of the conduit and openings therethrough for receiving the electric wires, a nut on the threaded end of the conduit, a threaded sleeve engaging the threads on the cap, and formed with an apertured flange through which the upper threaded end of the conduit loosely passes, said flange engaging the lower side of the nut, whereby when the sleeve is threaded onto the threads of the cap the cap will be drawn toward the end of the conduit and secured thereto, as described.

5. The combination with a threaded end of an electric conduit, a nut thereon serving as a shoulder and connected thereto, said nut being located below the end of the conduit, a cap having threads on its lower external surface and formed with divergent openings therethrough to receive the electric wires, a threaded sleeve formed with an opening through its flanged portion to receive the conduit and engage the lower side of the nut, the threads of the sleeve engaging the threads of the cap, whereby when the sleeve is threaded on to the cap the cap is drawn into engagement with the upper side of the nut, as described.

6. In a device of the character described, the combination with an electric conduit having a threaded end, an insulating cap or fitting formed with divergent openings extending therethrough and provided with external threads on the periphery adjacent its lower end, a threaded sleeve to engage the threads of the cap, the cap having a shouldered recessed portion adjacent its lower end to receive the threaded end of the conduit, a nut having upper and lower surfaces that are parallel to each other on the threaded end of the conduit for engaging the cap, and a flange on the threaded sleeve for engaging the nut to draw the cap toward the conduit for securing the conduit and cap together when the sleeve is rotated, the nut being located at the extreme lower end of the cap with its upper surface engaging the end of the cap below the recessed portion and the flange of the threaded sleeve engaging the lower surface of the nut.

7. The combination with an electric conduit, of a cap formed with divergent openings in its upper ends for separating the wires and for closing the end of the conduit, the lower external surface of the cap having threads thereon, that portion of the cap below the divergent openings having an axially arranged opening which terminates at the lower end of the cap, a portion of this opening having a shouldered recess to directly receive the end of the conduit, a nut having oppositely disposed faces, the upper face engaging the extreme lower end of the cap, a threaded sleeve engaging threads on the cap, said sleeve having a perforated flange which engages the lower surface of the nut, the rotation of the sleeve on the cap serving to draw the shouldered recessed portion of said cap against the conduit without disturbing or twisting the wires, as described.

JAMES C. PHELPS.

Witnesses:
HARRY W. BOWEN,
H. E. HARTWELL.